(12) United States Patent
Mansour et al.

(10) Patent No.: US 12,309,818 B2
(45) Date of Patent: May 20, 2025

(54) ELIMINATING OVERLAPPING SPECTRUM INTERFERENCE USING ORTHOGONAL CODES

(71) Applicant: T-MOBILE INNOVATIONS LLC, Overland Park, KS (US)

(72) Inventors: Nagi A Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 435 days.

(21) Appl. No.: 17/960,329

(22) Filed: Oct. 5, 2022

(65) Prior Publication Data

US 2024/0121810 A1  Apr. 11, 2024

(51) Int. Cl.
*H04W 4/00* (2018.01)
*H04W 72/541* (2023.01)

(52) U.S. Cl.
CPC ............................... *H04W 72/541* (2023.01)

(58) Field of Classification Search
CPC ............ H04W 72/541; H04W 72/0453; H04L 5/0073
See application file for complete search history.

(56) References Cited

U.S. PATENT DOCUMENTS

| | | | | |
|---|---|---|---|---|
| 7,792,532 B1 * | 9/2010 | Narayanabhatla | .... | H04W 16/28 455/447 |
| 9,374,205 B1 * | 6/2016 | Mansour | ............... | H04L 5/0037 |
| 2010/0008317 A1 * | 1/2010 | Bhattad | ................ | H04L 5/0073 370/329 |
| 2011/0116560 A1 * | 5/2011 | Mueck | .................. | H04L 1/0668 375/295 |

FOREIGN PATENT DOCUMENTS

CN 102724156 A * 10/2012
WO WO-2011103122 A1 * 8/2011 ............ H04W 16/14

* cited by examiner

*Primary Examiner* — Thai Dinh Hoang
(74) *Attorney, Agent, or Firm* — Shook, Hardy & Bacon L.L.P.

(57) ABSTRACT

Aspects provided herein to provide methods, systems, and a non-transitory computer storage media storing computer-useable instructions to eliminate overlapping spectrum interference. The method begins with assigning a first portion of contiguous spectrum to a first user equipment. A second portion of contiguous spectrum is assigned to a second user equipment. The first portion of contiguous spectrum and the second portion of contiguous spectrum overlap at least partially. Based on the partial overlap, the first user equipment is instructed to communicate on the first portion of contiguous spectrum using a first code and the second user equipment is instructed to communicate on the second portion of contiguous spectrum using a second code. The use of the first code and the second code eliminate interference in the partial overlapping spectrum.

20 Claims, 4 Drawing Sheets

ELIMINATING OVERLAPPING SPECTRUM INTERFERENCE USING ORTHOGONAL CODES

BACKGROUND

Spectrum for wireless communication is a scarce and precious resource with increasing numbers and types of devices accessing networks. Network operators bid for spectrum and competition for use is keen. A network operator may be successful in bidding for an amount of spectrum and if successful, wants to use the allotted resource efficiently and allow the greatest number of possible users access. In some cases this can mean very close or even overlapping channels are used. Overlapping channels can generate interference that degrades performance for users at both ends of the overlap.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for eliminating overlapping spectrum interference are provided. The method begins with assigning a first portion of contiguous spectrum to a first user equipment (UE). A second portion of contiguous spectrum is assigned to a second UE. The first and second portions of contiguous spectrum overlap at least partially. Based on the partial overlap the first UE is instructed to communicate on the first portion of contiguous spectrum using a first code and the second UE is instructed to communicate on the second portion of the contiguous spectrum using a second code.

In a further embodiment, a method for eliminating overlapping spectrum interference is provided. The method begins with instructing a first user equipment (UE) to communicate on a first portion of contiguous spectrum using a first code. The first portion of contiguous spectrum overlaps a second portion of contiguous spectrum. The second UE is instructed to communicate on the second portion of contiguous spectrum using a second code.

An additional embodiment provides a non-transitory computer storage media storing computer-useable instructions that, when executed by one or more processors cause the processors to eliminate overlapping spectrum interference. The instructions cause the processors to assign a first portion of contiguous spectrum to a first user equipment (UE). A second portion of contiguous spectrum is assigned to a second UE. The first portion of contiguous spectrum and the second portion of contiguous spectrum at least partially overlap. Based on the partial overlap, the first UE is instructed to communicate on the first portion of contiguous spectrum using a first code and the second UE is instructed to communicate on the second portion of contiguous spectrum using the second code.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 500 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

Aspects of the present disclosure provide a way to eliminate overlapping spectrum interference by using orthogonal codes to separate the overlapping channels. In accordance with a first aspect of the present disclosure a method for eliminating overlapping spectrum interference using orthogonal codes is provided. The method provides for assigning a first portion of contiguous spectrum to a first user equipment (UE). A second portion of contiguous spectrum is them assigned to a second UE. The first portion of contiguous spectrum overlaps at least partially the second portion of contiguous spectrum. Based on the partial overlap, the first UE is instructed to communicate on the first portion of the contiguous spectrum using a first code and the second UE is instructed to communicate on the second portion of contiguous spectrum using a second code.

A second aspect of the present disclosure provides a method for eliminating overlapping spectrum interference. The method begins with instructing a first user equipment (UE) to communicate on a first portion of contiguous spectrum using a first code. The first portion of contiguous spectrum overlaps a second portion of contiguous spectrum. A second UE is instructed to communicate on the second portion of contiguous spectrum using a second code.

Another aspect of the present disclosure is directed to a non-transitory computer storage media storing computer-useable instructions that, when used by one or more processors, cause the processors to assign a first portion of contiguous spectrum to a first user equipment (UE). A second portion of contiguous spectrum is assigned to a second UE. The first portion of contiguous spectrum and the second portion of contiguous spectrum overlap at least partially. Based on the partial overlap, the first UE is instructed to communicate on the first portion of contiguous spectrum using a first code and the second UE is instructed to communicate on the second portion of contiguous spectrum using the second code.

Figure 1:
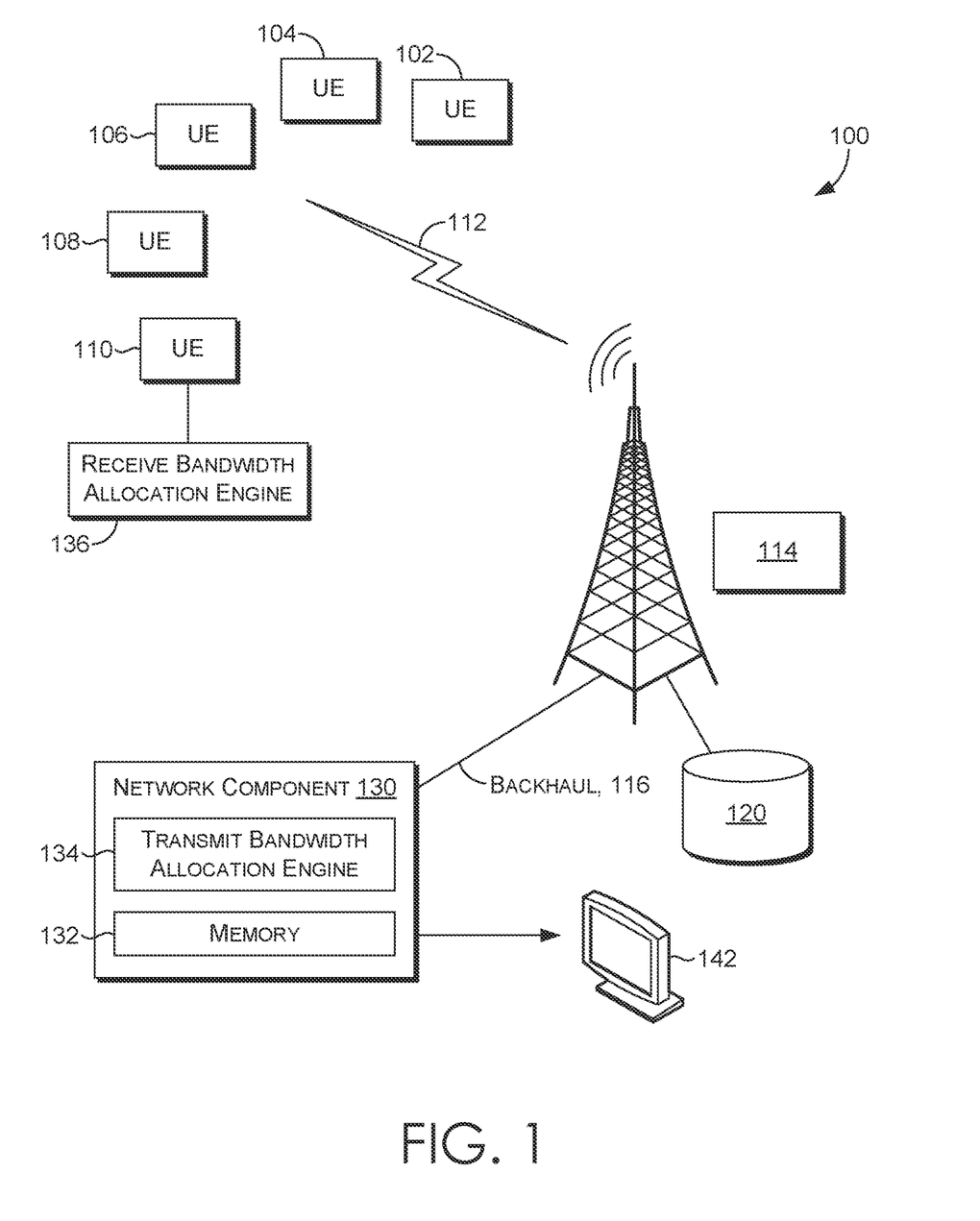
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Network environment 100 includes user equipment (UE) devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (500) that communicates via wireless communications with the base station 114 in order to interact with a public or private network.

Figure 5:
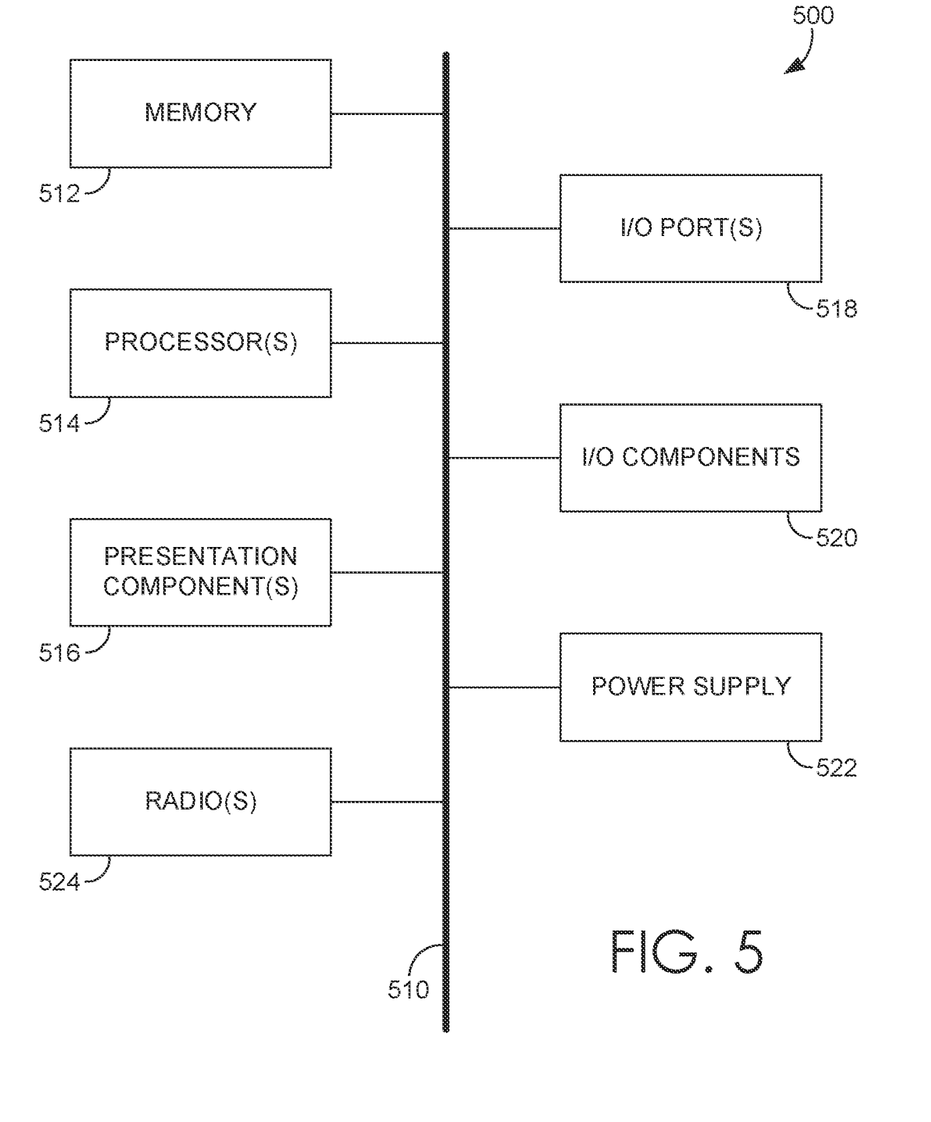
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by the UEs 102, 104, 106, 108, and 110 to the base station 114. Base station 114 may store the data communicated by the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132 and a transmit bandwidth allocation engine 134. All determinations, calculations, and data further generated by the transmit bandwidth allocation engine 134 may be stored at the memory 132 and also at the data store 140. Although the network component 130 is shown as a single component comprising the memory 132 and the transmit bandwidth allocation engine 134, it is also contemplated that each of the memory 132 and the transmit bandwidth allocation engine 134 may reside at different locations, be its own separate entity, and the like, within the home network carrier system.

The network component 130 is configured to retrieve signal information, UE device information, latency information, including quality of service (QoS) information, and metrics from the base station 114 or one of the UE devices 102, 104, 106, 108, and 110. UE device information can include a device identifier and data usage information. The transmit bandwidth allocation engine 134 can observe and track data usage and channels selected for UEs 102, 104, 106, 108, and 110. The transmit bandwidth allocation engine 134 can be located in a central office or other centralized location for a virtualized radio access network. For a distributed radio access network, the transmit bandwidth allocation engine 134 can be located at the base station 114. The base station 114 may be a gNodeB that interfaces with the transmit bandwidth allocation engine 134. The transmit bandwidth allocation engine 134 eliminates overlapping spectrum interference for UEs 102, 104, 106, 108, and 110, any one of which may be using one of two channels sharing a bandwidth. For example, the bandwidth may be 194 MHz with two channels of 100 MHz sharing the bandwidth. Any of the UEs 102, 104, 106, 108, and 110 may be assigned one of the two 100 MHz channels. Each of the UEs 102, 104, 106, 108, and 110 can include a receive bandwidth allocation engine 136 that can operate in conjunction with the transmit bandwidth allocation engine 134 in network component 130.

Figure 2:
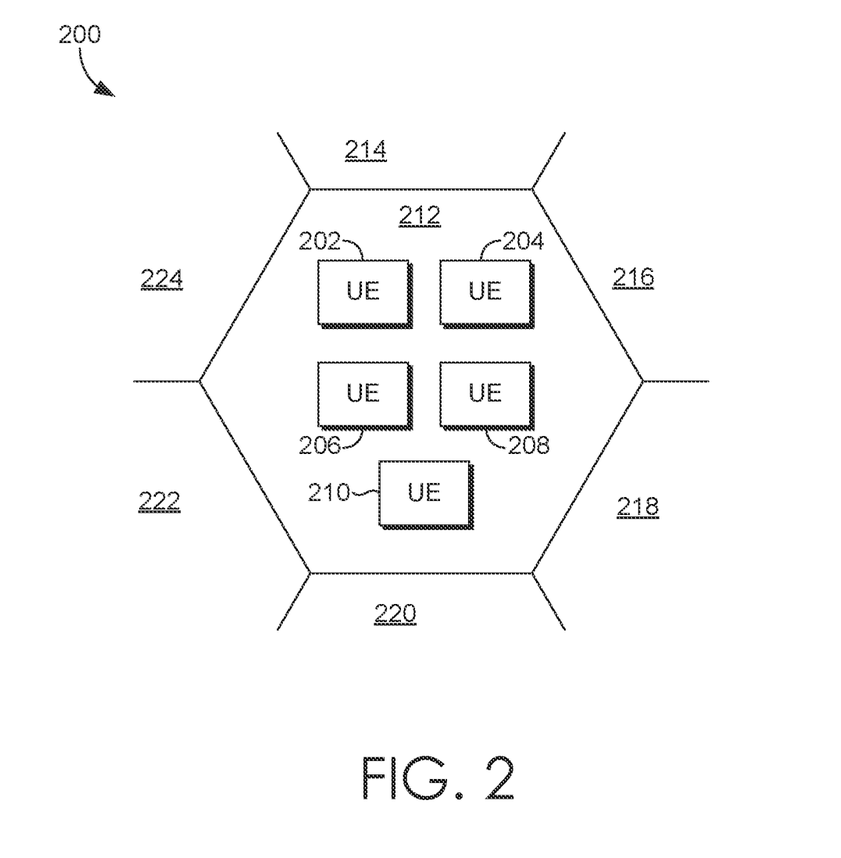
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of XR devices may be located within each geographic area collecting data within the geographic area at a given time. For example, as shown in FIG. 2, XR devices 202, 204, 206, 208, and 210, may be located within geographic area 200 collecting data that is useable by network component 130, in accordance with aspects herein. XR devices 202, 204, 206, 208, and 210 can move within the cell currently occupying, such as cell 212 and can move to other cells such as adjoining cells 214, 216, 218, 220, 222 and 224.

While FIG. 2 depicts a terrestrial cellular network, developments in communication are increasingly turning to extraterrestrial networks. These extraterrestrial networks may interact with terrestrial cellular networks through low earth orbiting satellites that can be deployed in constellations of satellites. Each satellite may serve as an extraterrestrial base station. An extraterrestrial base station may comprise a first base station and a second base station. The extraterrestrial network can be used for communication on a first portion of contiguous spectrum while a terrestrial base station can be used for communication on a second portion of contiguous spectrum. Alternatively, both the first and second portions of contiguous spectrum may use the extraterrestrial network for communication.

Figure 3:
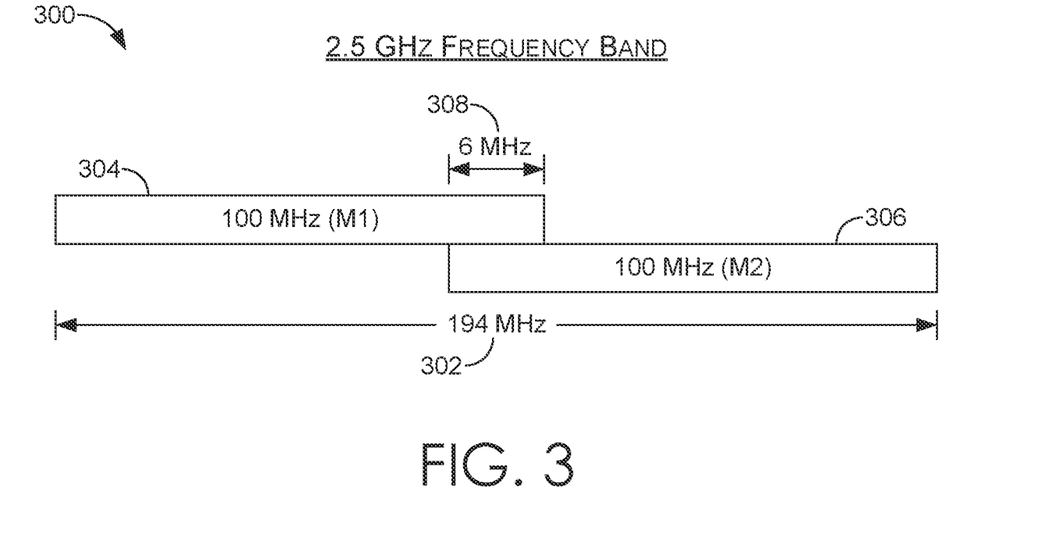
FIG. 3 depicts overlapping channels in the 2.5 GHz band within a 194 MHz allocation, in accordance with aspects herein.

FIG. 3 depicts overlapping channels in the 2.5 GHz band within a 194 MHz allocation, in accordance with aspects herein. FIG. 3 depicts part of a frequency band 300, such as the 2.5 GHz band, with a spectrum segment 302. Spectrum segment 302 represents a portion of a frequency band which a network provider may channelize and assign to UEs such as UEs 102, 104, 106, 108, and 110 of FIG. 1 and XR devices 202, 204, 206, 208, and 210 of FIG. 2. Spectrum segment 302 can be divided into two channels, a first channel 304 and a second channel 306. The bandwidth of first channel 304 and second channel 306 when added together is greater than the bandwidth of the spectrum segment 302. For example, first channel 304 may be 100 MHz and second channel 306 may also be 100 MHz. When added together the total bandwidth of first channel 304 and second channel 306 totals 200 MHz, which is 6 MHz greater than the bandwidth of spectrum segment 302, which is 194 MHz. This results in an overlap 308. In the example, the overlap is 6 MHz.

Channels that overlap can generate interference that degrades the performance of the network for both users, such as the users of first channel 304 and second channel 306. Such adjacent channel interference can cause garbled transmissions and adversely affect intelligibility, device performance, and other aspects of the user's network experience. When adjacent channel interference occurs transmissions from first channel 304 can bleed over into second channel 306, adding noise to the signal received.

A network provider with a spectrum allocation like the one described above may need to address the overlap 308. The overlapping channels may be accommodated by utilizing a technique to separate the first channel 304 from the second channel 306. The first channel 304 may be denoted by M1 and the second channel 306 may be denoted by M2. The first channel 304 of may be multiplied by a first code, known as C1. The product can be shown as M1*C1. Similarly, the second channel 306 may be multiplied by a second code, known as C2. The product can be shown as M2*C2.

When a UE, such as one of UEs 102, 104, 106, 108, and 110, receives the products, the UE receives M1*C1 and M2*C2. This can be notated as M1*C1+M2*C2. The receiving UE can separate the channel it will use by performing additional multiplication. M1 can be separated by multiplying by C1, notated as C1(C1*C1) and M2 can be separated by multiplying by C2, notated as C2(C2*C2). In the M1 multiplication C1*C1=1 and in the M2 multiplication C2*C2=1. With the foregoing operations the first channel 304 is separated from the second channel 306, eliminating the adjacent channel interference.

Codes C1 and C2 are orthogonal codes and are whole numbers. Both codes C1 and C2 may be any size and are predetermined by the network operator. Codes may also vary by location, for example, each base station in a network may use different codes. Orthogonal codes are selected because they have a cross-correlation that is equal to zero, as a result, they do not interfere with one another. This cross-correlation can be expressed as: C1×C2=0. The codes C1 and C2 use the entire band, in this example, 2.5 GHz.

Figure 4:
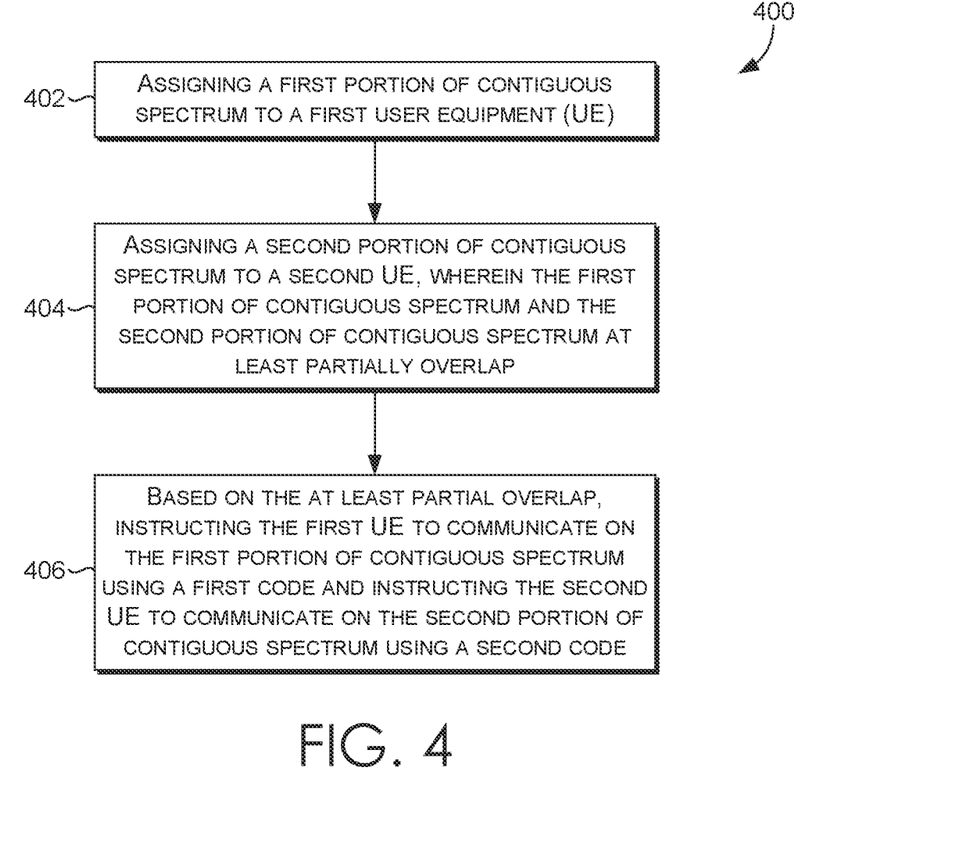
FIG. 4 is a flow diagram of an exemplary method for eliminating overlapping spectrum interference using orthogonal codes, in which aspects of the present disclosure may be employed, in accordance with aspects herein.

FIG. 4 is a flow diagram of an exemplary method for eliminating overlapping spectrum interference using orthogonal codes, in which aspects of the present disclosure may be employed, in accordance with aspects herein. The method 400 begins in step 402 with assigning a first portion of contiguous spectrum to a first user equipment (UE). Then in step 404 a second portion of contiguous spectrum is assigned to a second UE. The first portion of contiguous spectrum and the second portion of contiguous spectrum at least partially overlap. Then in step 406, based on the partial overlap, the method continues with instructing the first UE to communicate on the first portion of contiguous spectrum using a first code and instructing the second UE to communicate on the second portion of contiguous spectrum using a second code. The use of the first and second codes eliminates interference in the partial spectrum overlap. The code may be selected to be a whole number and may also be unique to the location. As an example, a code may be unique to a base station in a particular location. The uplink message may be sent to a base station by a UE. Both the base station and the UE have an allocation engine for performing the separation of the overlapping channels. The network component 130 of FIG. 1 includes a transmit bandwidth allocation engine 134 and the UE 110 includes a receive bandwidth allocation engine 136, both of which perform the separation of the overlapping channels.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device, including the goggles of an XR device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for eliminating overlapping spectrum interference, comprising:
    assigning a first portion of contiguous spectrum to a first user equipment (UE);
    assigning a second portion of contiguous spectrum to a second UE, wherein the first portion of contiguous spectrum and the second portion of contiguous spectrum at least partially overlap; and
    based on the at least partial overlap, instructing the first UE to communicate on the first portion of contiguous spectrum using a first code and instructing the second UE to communicate on the second portion of contiguous spectrum using a second code.

2. The method of claim 1, wherein the use of the first code and the second code eliminates interference in the at least partial overlap of spectrum.

3. The method of claim 1, wherein the communication on at least one of the first portion of contiguous spectrum or the second portion of contiguous spectrum is being communicated to an extraterrestrial base station.

4. The method of claim 3, wherein the communications on both the first portion of contiguous spectrum and the second portion of contiguous spectrum are being communicated to the extraterrestrial base station.

5. The method of claim 4, wherein the extraterrestrial base station comprises a first base station and a second base station.

6. The method of claim 3, wherein the communication on the first portion of contiguous spectrum is communicated to the extraterrestrial base station and the communication on the second contiguous spectrum is communicated to a terrestrial base station.

7. The method of claim 1, wherein the first portion of contiguous spectrum overlaps the second portion of contiguous spectrum by at least one megahertz (MHz).

8. The method of claim 1, wherein the first portion of contiguous spectrum occupies an equal amount of a same spectrum segment as the second portion of contiguous spectrum.

9. The method of claim 1, wherein the first code and the second code are orthogonal to one another.

10. The method of claim 9, wherein the first code and the second code are whole numbers.

11. The method of claim 1, wherein the first code is associated with a first location.

12. The method of claim 1, wherein the second code is associated with a second location.

13. A method for eliminating overlapping spectrum interference, comprising:
instructing a first user equipment (UE) to communicate on a first portion of contiguous spectrum using a first code, the first portion of contiguous spectrum overlapping a second portion of contiguous spectrum; and
instructing a second UE to communicate on the second portion of contiguous spectrum using a second code.

14. The method of claim 13, wherein the first code multiplied by itself equals one.

15. The system of claim 13, wherein the second code multiplied by itself equals one.

16. The system of claim 13, wherein the first code and the second code are orthogonal to one another.

17. The system of claim 14, wherein the first portion of contiguous spectrum occupies an equal amount of a same spectrum segment as the second portion of contiguous spectrum.

18. A non-transitory computer storage media storing computer-useable instructions that, when used by one or more processors, cause the processors to:
assign a first portion of contiguous spectrum to a first user equipment (UE);
assign a second portion of contiguous spectrum to a second UE, wherein the first portion of contiguous spectrum and the second portion of contiguous spectrum at least partially overlap; and
based on the at least partial overlap, instructing the first UE to communicate on the first portion of contiguous spectrum using a first code and instructing the second UE to communicate on the second portion of contiguous spectrum using the second code.

19. The non-transitory computer storage media of claim 18, wherein the first code is a whole number and is orthogonal to a second code used on the second portion of contiguous spectrum.

20. The non-transitory computer storage media of claim 18, wherein the first code is associated with a first location.

* * * * *